(12) United States Patent
Nakatsuji et al.

(10) Patent No.: US 11,123,264 B2
(45) Date of Patent: Sep. 21, 2021

(54) FROZEN STORAGE CONTAINER AND FROZEN STORAGE CONTAINER SYSTEM

(71) Applicants: NIPRO CORPORATION, Osaka (JP); KYOTO UNIVERSITY, Kyoto (JP)

(72) Inventors: Norio Nakatsuji, Kyoyo (JP); Hirofumi Suemori, Kyoto (JP); Tsuneo Takahashi, Kyoto (JP); Eihachiro Kawase, Kyoto (JP); Atsushi Taguchi, Osaka (JP); Ryo Tomii, Osaka (JP)

(73) Assignees: NIPRO CORPORATION; KYOTO UNIVERSITY

( * ) Notice: Subject to any disclaimer, the term of this patent is extended or adjusted under 35 U.S.C. 154(b) by 319 days.

(21) Appl. No.: 16/313,410

(22) PCT Filed: Jun. 27, 2017

(86) PCT No.: PCT/JP2017/023536
§ 371 (c)(1),
(2) Date: Dec. 26, 2018

(87) PCT Pub. No.: WO2018/003786
PCT Pub. Date: Jan. 4, 2018

(65) Prior Publication Data
US 2019/0159968 A1 May 30, 2019

(30) Foreign Application Priority Data
Jun. 28, 2016 (JP) .............................. JP2016-127837

(51) Int. Cl.
*A61J 1/14* (2006.01)
*B65B 7/02* (2006.01)
(Continued)

(52) U.S. Cl.
CPC .............. *A61J 1/1406* (2013.01); *A01N 1/02* (2013.01); *A01N 1/0284* (2013.01); *A61J 1/201* (2015.05);
(Continued)

(58) Field of Classification Search
CPC . A61J 1/1406; A61J 1/201; A61J 3/00; A01N 1/02; A01N 1/0284; B65B 7/02; B65B 51/22; B65D 51/002
See application file for complete search history.

(56) References Cited

U.S. PATENT DOCUMENTS

2008/0300570 A1* 12/2008 Fowles ................. A61J 1/1406
604/410
2014/0147916 A1* 5/2014 Hirai .................... A01N 1/0252
435/307.1
(Continued)

FOREIGN PATENT DOCUMENTS

CN 101242800 A * 8/2008 ........... A61K 38/482
CN 1897908 B 4/2011
(Continued)

OTHER PUBLICATIONS

CN101242800A-OH Machine English Translation (Year: 2008).*

*Primary Examiner* — Michael L Hobbs
*Assistant Examiner* — Lenora A Abel
(74) *Attorney, Agent, or Firm* — Jordan and Koda, PLLC

(57) ABSTRACT

A biological sample or drug stored inside a frozen storage container is not susceptible to contamination. The frozen storage container includes a container body with an internal space, and a partition wall which divides the internal space at least into a first space and a second space. In the container body, the first space is liquid-tightly sealed, the second space has an opening which is in communication with the outside, and the second space is liquid-tightly sealable by welding the container body. A frozen storage container system (Continued)

includes the frozen storage container; and a needle member which includes a needle tip portion capable of being inserted into the internal space of the container body and capable of piercing the partition wall, and has a flow path which is opened at the needle tip portion and is opened at a base end portion opposite to the needle tip portion.

11 Claims, 10 Drawing Sheets

(51) Int. Cl.
- *A01N 1/02* (2006.01)
- *A61J 3/00* (2006.01)
- *B65B 51/22* (2006.01)
- *A61J 1/20* (2006.01)
- *B65D 51/00* (2006.01)

(52) U.S. Cl.
CPC .................................. *A61J 3/00* (2013.01); *B65B 7/02* (2013.01); *B65B 51/22* (2013.01); *B65D 51/002* (2013.01)

(56) References Cited

U.S. PATENT DOCUMENTS

| | | | |
|---|---|---|---|
| 2015/0209230 A1* | 7/2015 | Lev | A61J 1/2055 604/414 |
| 2016/0304227 A1 | 10/2016 | Kurosaki et al. | |
| 2017/0156312 A1* | 6/2017 | Farrington | A01N 1/021 |

FOREIGN PATENT DOCUMENTS

| | | |
|---|---|---|
| CN | 101166505 B | 12/2011 |
| CN | 101242800 B | 2/2012 |
| EP | 0538891 A1 | 4/1993 |
| EP | 1880704 B1 | 3/2011 |
| JP | 57-83284 A | 5/1982 |
| JP | 2007161307 A | 6/2007 |
| JP | 5011810 B2 | 8/2012 |
| JP | 2013-5825 A | 1/2013 |
| JP | 2016-40172 A | 3/2016 |
| WO | 2014/019942 A1 | 2/2014 |
| WO | 2016025847 A1 | 2/2016 |

* cited by examiner

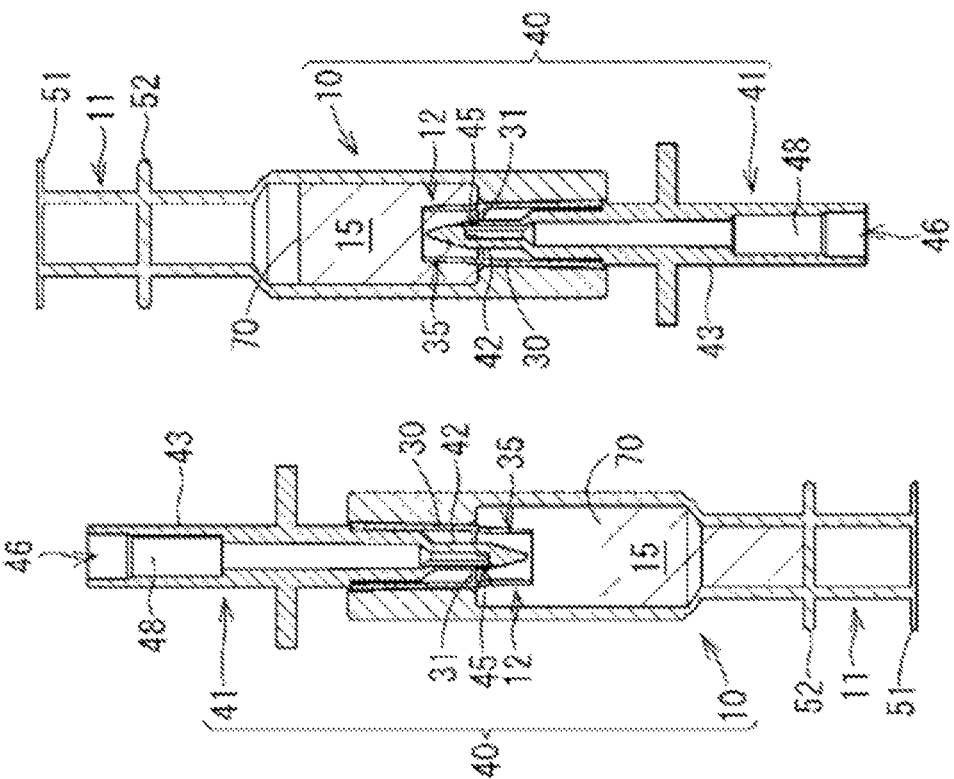
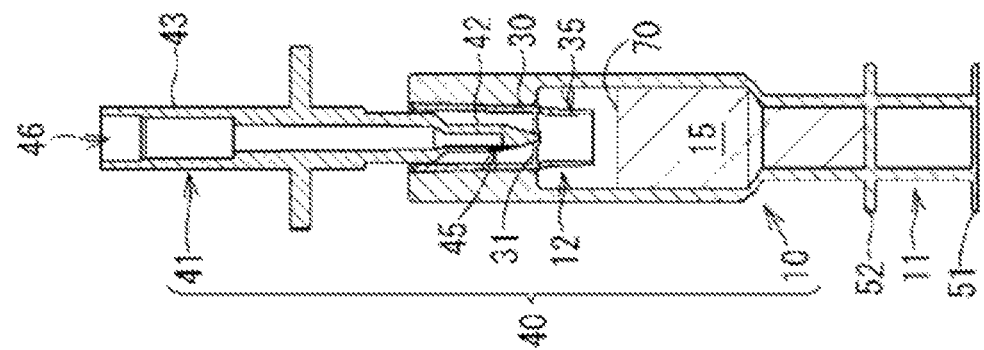
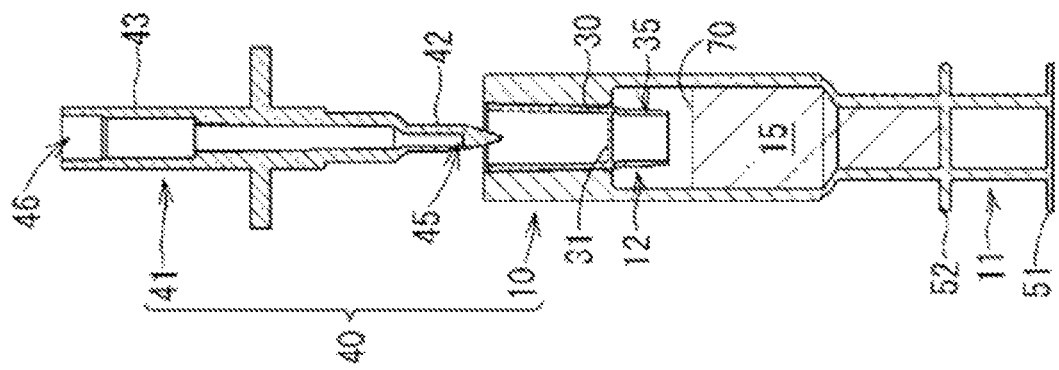
FIG. 8(A)　　FIG. 8(B)　　FIG. 8(C)　　FIG. 8(D)

FROZEN STORAGE CONTAINER AND FROZEN STORAGE CONTAINER SYSTEM

TECHNICAL FILED

The present invention relates to a frozen storage container and a frozen storage container system which are used for frozen storage of a biological sample or a drug.

BACKGROUND ART

As a container for freezing and storing a drug or a biological sample such as a cell, there is known a so-called screw cap type container in which a cap is screwed onto a tubular container containing a biological sample or a drug to seal the container. In addition, Patent Literatures 1 and 2 disclose a frozen storage container whose container opening is sealed by welding a part of the container.

CITATION LIST

Patent Literature

Patent Literature 1: Japanese Patent No. 5011810
Patent Literature 2: Japanese Patent Publication No. 1-83284

SUMMARY OF INVENTION

Technical Problem

When a biological sample or a drug is sealed in a screw cap type container and the biological sample or drug is frozen with liquid nitrogen, the liquid nitrogen may infiltrate from a gap between the container and the cap. As a result, the biological sample or drug in the container may be contaminated by viruses and bacteria mixed in the liquid nitrogen. Further, when the biological sample or drug sealed in the screw cap type container is unfrozen, the infiltrated liquid nitrogen vaporizes in the container, the pressure inside the container rises, and the cap may be strongly disengaged from the container when a user removes the container cap.

In the frozen storage container disclosed in Patent Literatures 1 and 2, the liquid nitrogen is less likely to enter the container as long as the sealing is performed reliably. However, when a part of the frozen storage container is cut and unsealed, viruses, bacteria or the like adhering to the outside of the frozen storage container may enter the frozen storage container via a cutting instrument or the like. As a result, the biological sample or drug stored in the frozen storage container may be contaminated by the viruses and bacteria or the like.

The present invention has been made in view of the above problem, and an object thereof is to provide means with which, during frozen storage of a biological sample or a drug, the biological sample or drug stored therein is not susceptible to contamination.

Solution to Problem (1) A frozen storage container according to the present invention includes a container body with an internal space; and a partition wall which divides the internal space of the container body at least into a first space and a second space, wherein in the container body, the first space is liquid-tightly sealed and the second space has an opening which is in communication with the outside, and wherein the second space is liquid-tightly sealable by welding the container body.

A sample to be frozen and stored such as a biological sample or a drug is injected into the second space of the container body through the opening. The second space is liquid-tightly sealed by welding. Therefore, infiltration of liquid nitrogen or the like into the second space is suppressed. When the frozen storage container is unsealed, a portion corresponding to the first space of the container body is cut and opened. Further, an opening is formed in the partition wall, and the sample stored in the second space is taken out through the opening. Since the partition wall is not exposed to an external environment during storage, contamination of the biological sample or drug stored in the second space is suppressed via the opening of the partition wall and an instrument for opening the partition wall.

(2) It is preferable that the second space is sealable by high-frequency welding the container body.

Therefore, since inner surfaces of the container body are welded to each other by high-frequency welding, poor welding or the like is less likely to occur.

(3) It is preferable that a portion defining the second space in the container body includes a neck portion whose external dimension is smaller than that of an end portion defining the opening of the second space.

The neck portion of the container body is welded, and thus poor welding or the like is less likely to occur.

(4) It is preferable that the container body is translucent for visible light to transmit therethrough.

Therefore, a state of the sample in the container can be visually observed from outside.

(5) It is preferable that the partition wall includes a tubular portion which is capable of being inserted into the internal space of the container body and a wall portion which divides an internal space of the tubular portion along a direction intersecting an axial direction of the tubular portion, and is inserted into the internal space of the container body, and the tubular portion is welded to the container body.

The container body and the partition wall are formed as separate members, and thus molding thereof is easy. In addition, since the container body and the partition wall are formed as separate members, the strength around the partition wall in the frozen storage container is stronger than the other portion. Therefore, it is easy to use a member to pierce the partition wall to take out the sample in the second space.

(6) It is preferable that the partition wall includes a through hole which penetrates the wall portion and a folding bar which is connected with the wall portion to seal the through hole and opens the through hole by breaking a connecting portion with the wall portion.

Therefore, the through hole can be easily formed in the partition wall.

(7) A frozen storage container system according to the present invention includes the frozen storage container; and a needle member which includes a needle tip portion capable of being inserted into the internal space of the container body and capable of piercing the partition wall, and has a flow path which is opened at the needle tip portion and is opened at an base end portion opposite to the needle tip portion.

Therefore, the sample in the second space can be taken out to the outside through an internal space of the needle member in a state where the needle tip portion of the needle member pierces the partition wall.

Advantageous Effects of Invention

According to the present invention, a biological sample or a drug stored inside the frozen storage container is not susceptible to contamination.

BRIEF DESCRIPTION OF DRAWINGS

FIGS. 8(A) to 8(D) are views schematically showing a frozen storage container system 40 for explaining a method for taking out the liquid from the inside of the frozen storage container 10;

DESCRIPTION OF EMBODIMENT

Hereinafter, a preferred embodiment of the present invention will be described. The present embodiment is merely one aspect of the present invention and it goes without saying that the embodiment can be changed within the scope without changing the gist of the present invention.

Frozen Storage Container System 40

Figure 5:
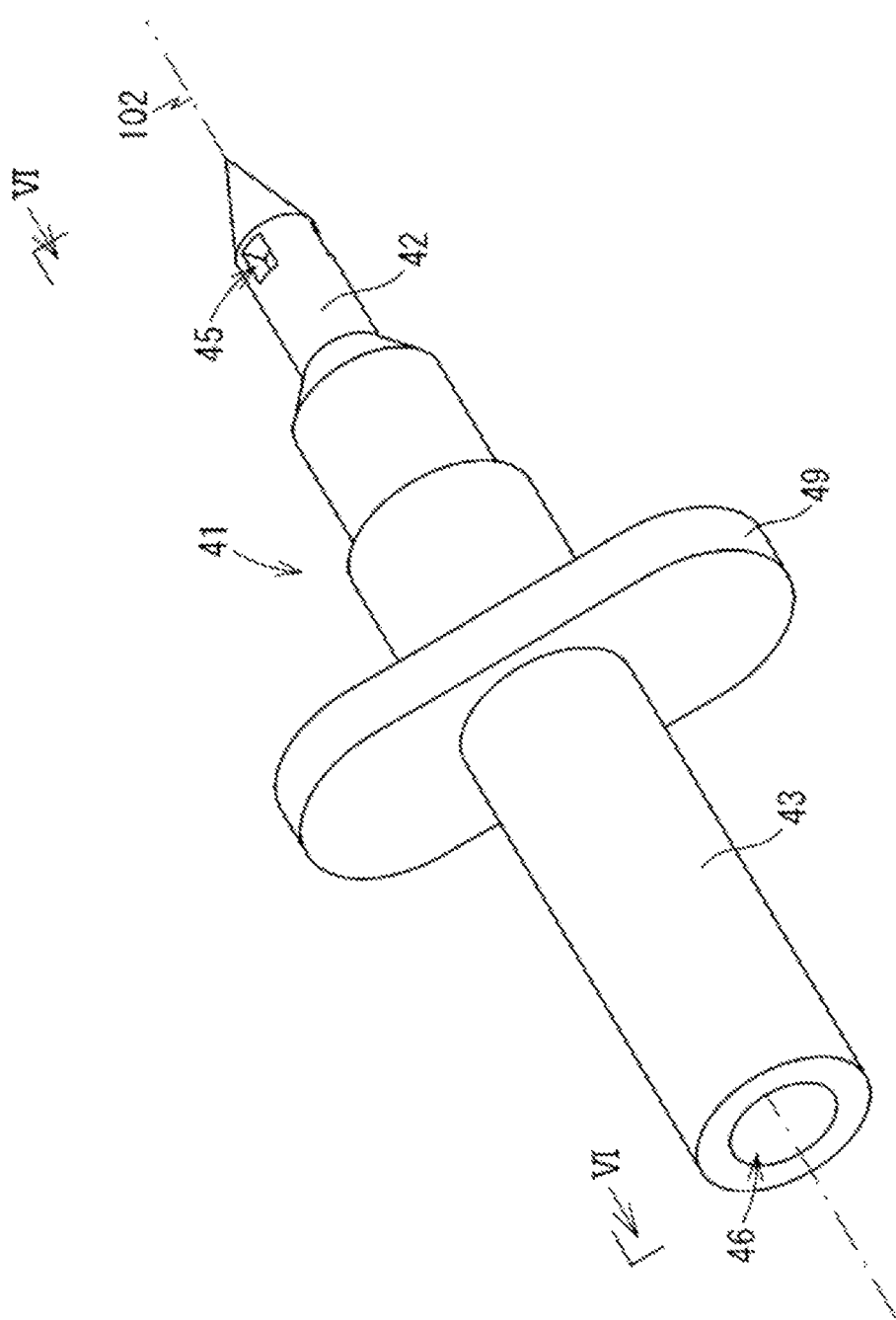
FIG. 5 is a perspective view of a needle member 41.

A frozen storage container system 40 includes a frozen storage container 10 (see FIG. 1) and a needle member 41 (see FIG. 5).

Frozen Storage Container 10

Figure 1:
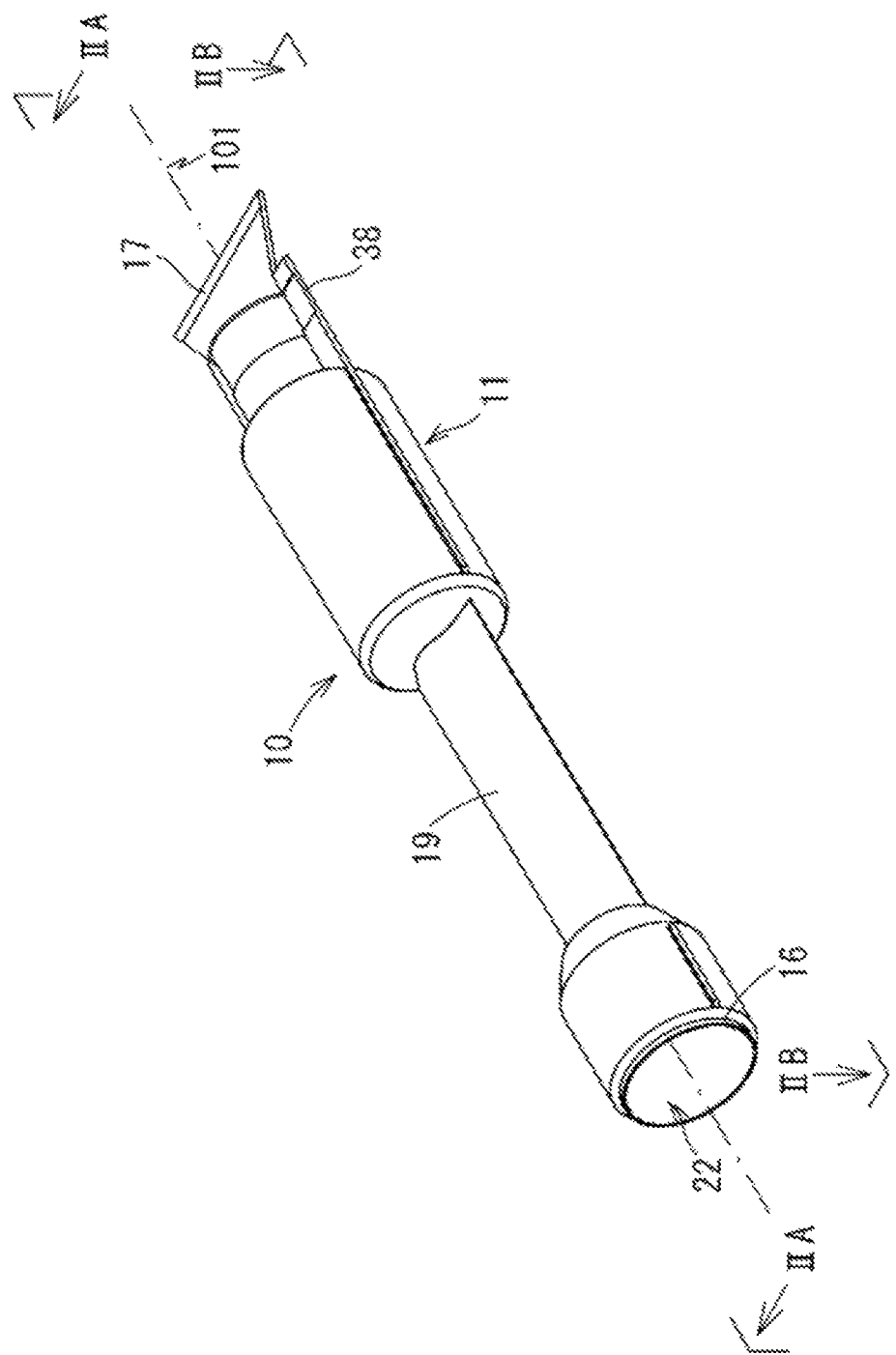
FIG. 1 is a perspective view of a frozen storage container 10.
Figure 2:
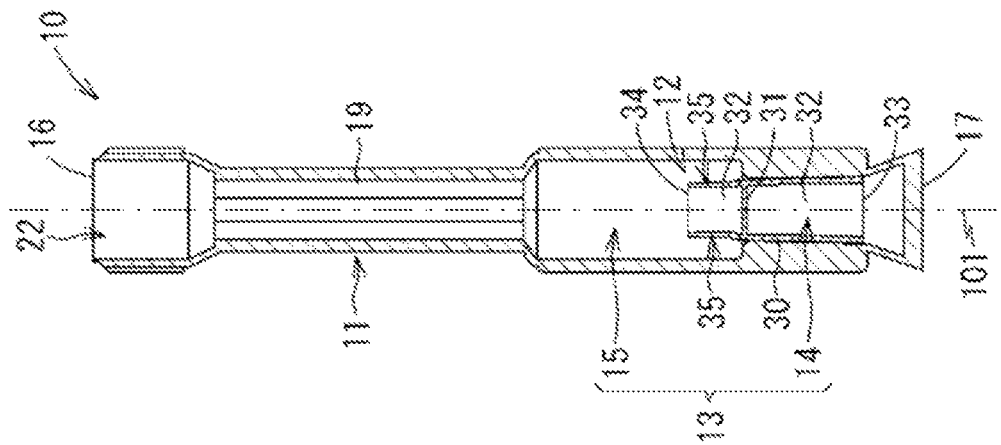
FIG. 2(A) is a cross-sectional view of the frozen storage container 10 taken along a cutting plane II(A)-II(A) shown in FIG. 1.
FIG. 2(B) is a cross-sectional view of the frozen storage container 10 taken along a cutting plane II(B)-II(B) shown in FIG. 1.
Figure 2:
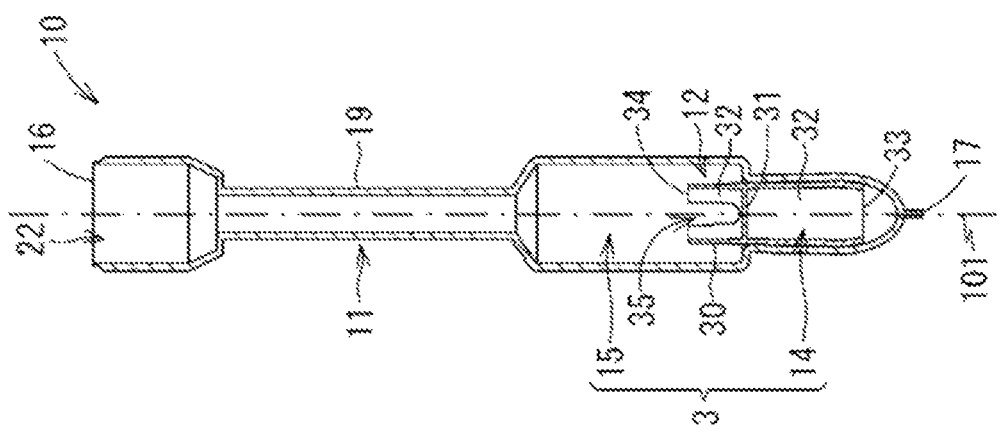

As shown in FIGS. 1 and 2, the frozen storage container 10 includes a container body 11 and a partition wall 12. The container body 11 is substantially cylindrical in shape and has an internal space 13. The container body 11 has an opening 22 at one end portion 16 in a direction along an axial line 101 and is liquid-tightly closed by high-frequency welding at the other end portion 17. In the container body 11, a neck portion 19 is formed at a part between the end portions 16, 17, an outer diameter dimension of which is smaller than an outer diameter dimension of the other portion. A part of the internal space 13 defined by the end portion 17 from the neck portion 19 is a space in which liquid is stored. A part of the internal space 13 defined by the end portion 16 from the neck portion 19 is a space through which the liquid is injected toward the end portion 17 into the internal space of the frozen storage container 10. An outer diameter dimension of a part of the container body 11 excluding the neck portion 19 is arbitrarily designed in consideration of the capacity of liquid that can be stored in the frozen storage container 10, but the outer diameter dimension is preferably about the same as the outer diameter dimension of a known screw cap type container, because it is possible to use a case capable of accommodating a plurality of screw cap type containers in alignment or the like. The outer diameter dimension of the neck portion 19 and a dimension thereof along the axial line 101 are designed in consideration to facilitate high-frequency welding to be described later.

It is preferable that the container body 11 is formed of a material which allows a user to easily cut a portion of the container body 11 using a tool such as scissors or a cutter. It is preferable that the container body 11 has temperature resistance to withstand a temperature during freezing by liquid nitrogen. It is preferable that the container body 11 is translucent, so that a liquid surface, a frozen state, or the like of the liquid stored in the internal space 13 of the container body 11 can be visually observed. Further, it is preferable that it is easy to liquid-tightly seal the internal space 13 of the container body 11 by high-frequency welding or the like. Specifically, examples of the material of the container body 11 include a thermoplastic resin such as an ethylene-vinyl acetate copolymer, a vinyl chloride copolymer, an ethylene-methyl methacrylate copolymer, low density polyethylene, high density polyethylene, ultrahigh molecular weight polyethylene, nylon, polyurethane, polypropylene, polyester, polystyrene, polyimide, polyacetal, a phenol resin, a urea resin, an epoxy resin, an ABS resin, and apolyethylene terephthalate, and it is preferable to use the ethylene-vinyl acetate copolymer because the copolymer has sufficient temperature resistance. The container body 11 is manufactured, for example, by blow molding a thermoplastic resin.

Figure 3:
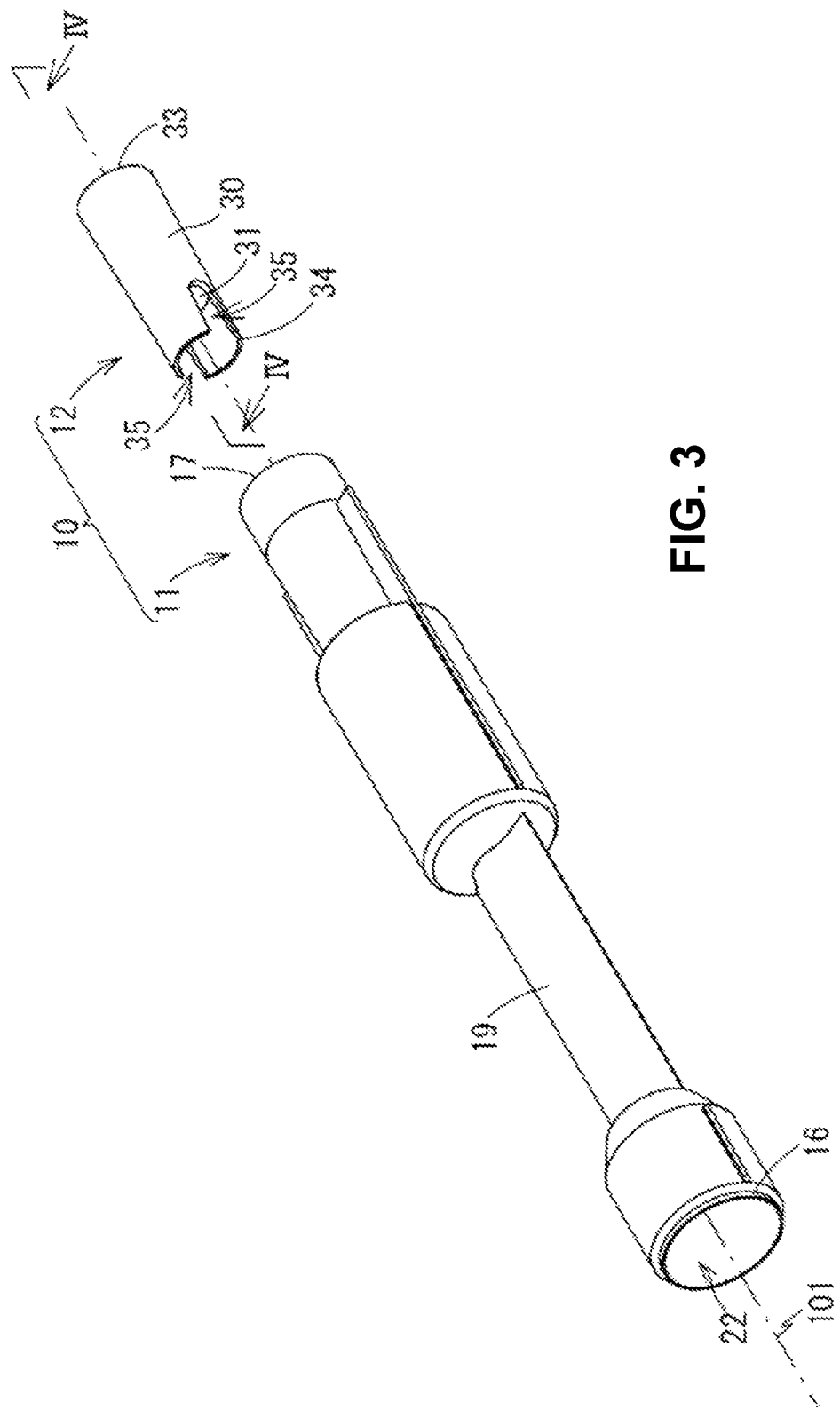
FIG. 3 is an exploded perspective view showing a container body 11 and a partition wall 12.
Figure 4:
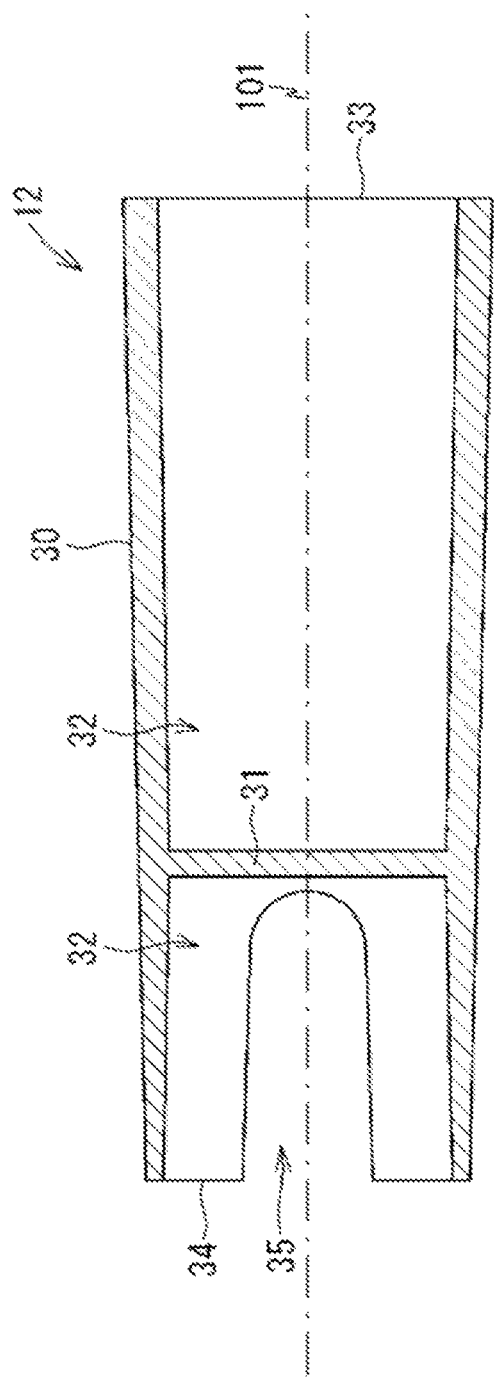
FIG. 4 is a cross-sectional view of the partition wall 12 taken along a cutting plane IV-IV shown in FIG. 3.

As shown in FIGS. 2 to 4, the partition wall 12 includes a tubular portion 30 and a wall portion 31. The tubular portion 30 is substantially cylindrical in shape and has an internal space 32. Each of end portions 33 and 34 in the direction along the axial line 101 of the tubular portion 30 is opened. The tubular portion 30 has a tapered shape whose outer diameter decreases from the end portion 33 toward the end portion 34. An outer diameter dimension of the tubular portion 30 at the end portion 34 is smaller than an inner diameter dimension in the vicinity of the end portion 17 of the container body 11. Therefore, the partition wall 12 is easily inserted from the end portion 34 to the end portion 17 of the container body 11 which is not yet sealed.

Cutout portions 35 extending along the direction of the axial line 101 are formed in the end portion 34 of the tubular portion 30. The cutout portions 35 are formed in pair at positions rotationally symmetrical by 180° with respect to an axial line of the tubular portion 30. Each cutout portion 35 extends to the vicinity of the wall portion 31 that partitions the internal space 32 of the tubular portion 30.

The wall portion 31 is a member that divides the internal space 32 of the tubular portion 30 into an end portion 33 side and an end portion 34 side. The wall portion 31 spreads in a direction intersecting a direction along the axial line 101 of the tubular portion 30. A thickness of the wall portion 31 is appropriately set such that the needle member 41 can easily pierce the wall portion 31 by the user.

It is preferable that the partition wall 12 is made of the same material as the container body 11 considering that the partition wall 12 is adhered to the container body 11 by high-frequency welding or the like. In addition, the partition wall 12 is manufactured, for example, by injection molding a thermoplastic resin.

The partition wall 12 is inserted from the end portion 34 into the end portion 17 of the container body 11 before the end portion 17 is sealed. After the partition wall 12 is inserted into the internal space 13 of the container body 11, high-frequency welding is performed in the vicinity of the end portion 17 of the container body 11, at most positions where the partition wall 12 exists, preferably positions closer to the end portion 34 than the wall portion 31, and thus the end portion 17 of the container body 11 is liquid-tightly sealed and the partition wall 12 is integrally welded to the container body 11. Therefore, the container body 11 is reduced in diameter along the outer diameter dimension of the partition wall 12 in the vicinity of the end portion 17, and an inner surface in the vicinity of the end portion 17 of the container body 11 is welded to an outer surface of the tubular portion 30 of the partition wall 12. In the vicinity of the end portion 17 of the container body 11, an end on a second space 15 side at a portion reduced in diameter by welding to the partition wall 12 is located substantially at the same position with the wall portion 31 of the partition wall 12 in the direction along the axial line 101. Apart of the container body 11 closer to the end portion 17 than the partition wall 12 is sealed by welding.

The internal space 13 of the container body 11 is divided into a first space 14 located on an end portion 17 side and a second space 15 located on an end portion 16 side by the wall portion 31 of the partition wall 12 welded to the container body 11.

Needle Member 41

Figure 6:
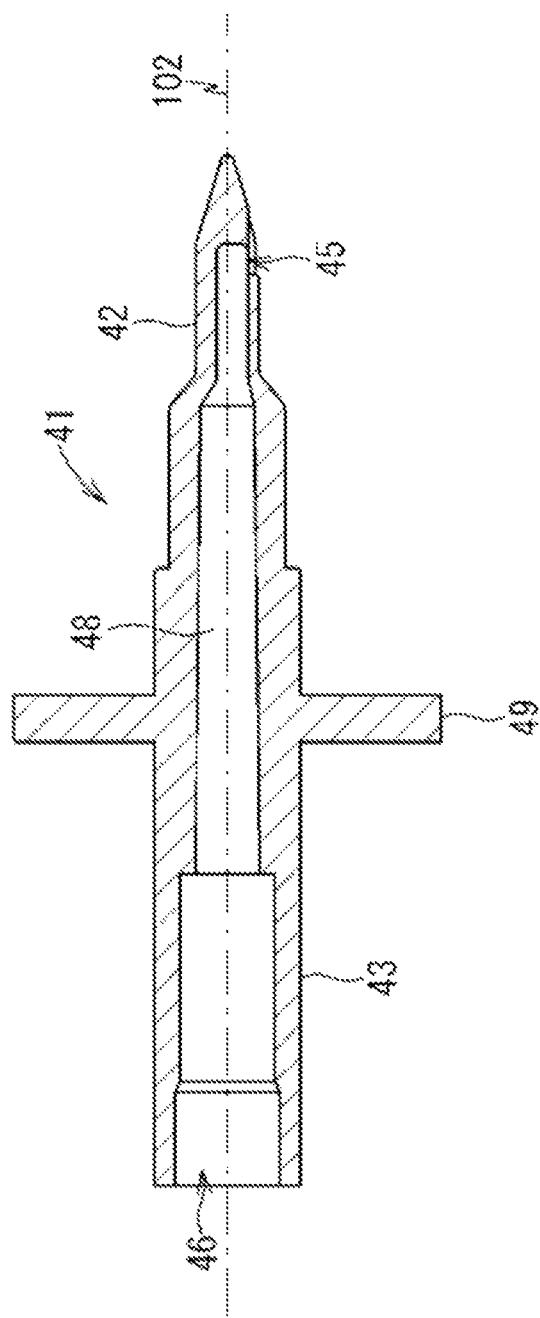
FIG. 6 is a cross-sectional view of the needle member 41 taken along a cutting plane VI-VI shown in FIG. 5.

As shown in FIGS. 5 and 6, the needle member 41 includes a needle tip portion 42 and a base end portion 43. The needle member 41 includes a flange portion 49 extending in a direction intersecting a direction along the axial line 101 of the base end portion 43.

The needle tip portion 42 has a cylindrical shape, is reduced diameter in tapered shape toward a tip end and has a sharp tip end. An outer diameter dimension of the needle tip portion 42 is smaller than an inner diameter dimension of each of the first space 14 and the second space 15 in the frozen storage container 10. Through holes 45 that establish communication between the outside and the internal space 48 are formed in the vicinity of the tip end of the needle tip portion 42. The through holes 45 are formed at equal intervals at three positions centering around the axial line 102 of the needle tip portion 42. The number and arrangement of the through holes 45 are not particularly limited, and for example, the through holes 45 may be formed at two positions in the needle tip portion 42, or may be formed at four or more positions. A distance between the through hole 45 and the flange portion 49 in a direction along the axial line 102 is longer than a distance between the wall portion 31 and the end portion 33 of the partition wall 12.

An outer diameter dimension of the base end portion 43 is larger than an outer diameter dimension of the needle tip portion 42. The outer diameter dimension of the base end portion 43 is about the same as or slightly larger than an inner diameter dimension of the first space 14 in the frozen storage container 10. The base end portion 43 forms one internal space 48 together with the needle tip portion 42. An end portion 46 of the base end portion 43 is opened. That is, the internal space 48 communicates with the outside through the through hole 45 and the end portion 46.

The needle member 41 is formed of a material that allows the needle tip portion 42 to pierce the wall portion 31 of the partition wall 12 of the frozen storage container 10 by an operation of the user. Specifically, the needle member 41 can be manufactured by injection molding a thermoplastic resin such as an acrylonitrile-butadiene-styrene copolymer synthetic resin, polycarbonate, polystyrene, polyethylene, and polypropylene.

Method for Using Frozen Storage Container System 40

Hereinafter, a method for using the frozen storage container system 40 will be described with reference to FIGS. 7(A) to 7(C) and FIGS. 8(A) to 8(C).

Figure 7A:
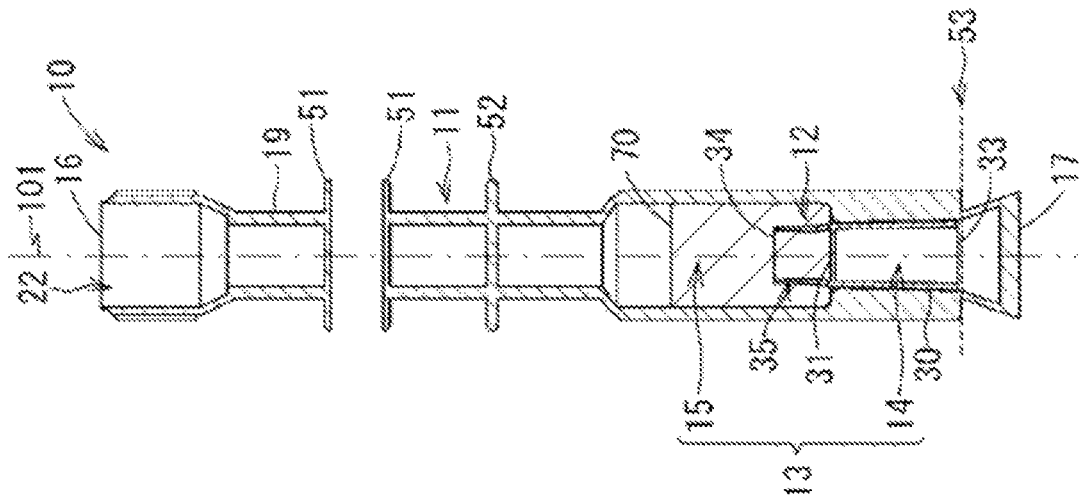
FIGS. 7(A) to 7(C) are views schematically showing the frozen storage container 10 for explaining a method for freezing and storing liquid inside the container.

As shown in FIG. 7(A), a liquid 70 such as a drug or a biological sample such as cell suspension is injected into the frozen storage container 10. Instruments such as pipettes are used for liquid injection. For example, the user inserts a tip end of a pipette or the like into the opening 22, and injects the liquid from the pipette or the like into the second space 15 of the frozen storage container 10. The injected liquid 70 is stored in the second space 15 of the frozen storage container 10.

Figure 7B:
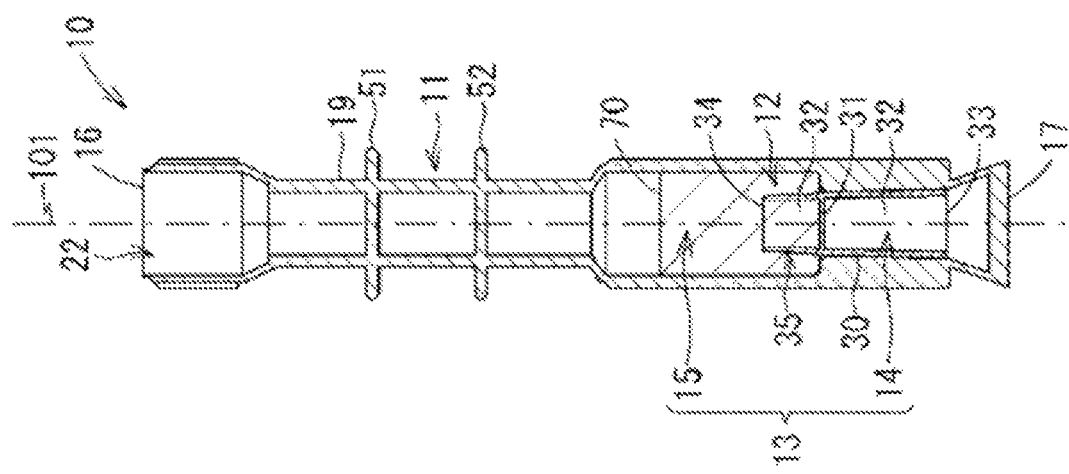

After the liquid is injected into the frozen storage container 10, as shown in FIG. 7(B), the neck portion 19 of the frozen storage container 10 is high-frequency welded. The high-frequency welding is performed using a device capable of irradiating a high-frequency wave to the neck portion 19, that is, a so-called high-frequency sealer, in a state where the neck portion 19 is sandwiched. As the neck portion 19 is sandwiched, facing inner surfaces of the neck portion 19 are brought into close contact with each other, and the inner surfaces in close contact with each other are welded by irradiating of the high-frequency wave. In order to secure the seal of the second space 15, it is preferable that the high-frequency welding at the neck portion 19 is performed at two different positions (referred to as welded portions 51 and 52, respectively) in the direction along the axial line 101.

Figure 7C:
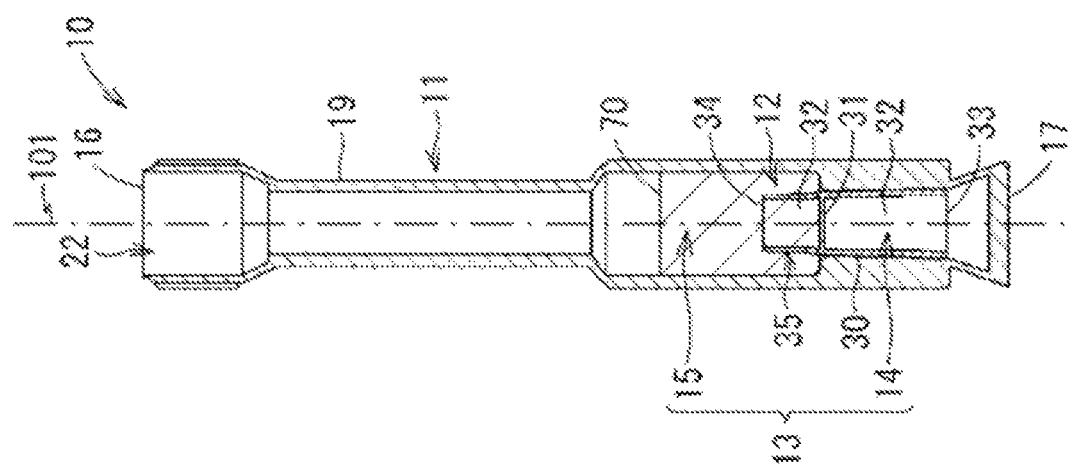

As shown in FIG. 7(C), after the second space 15 is closed by the welded portions 51 and 52, the frozen storage container 10 is cut at the welded portion 51 located near the end portion 16. The cutting is performed such that an internal space of the neck portion 19 between the welded portion 51 and the welded portion 51 is not unsealed. Therefore, a part of the frozen storage container 10 including the end portion 17 is separated from a part of the frozen storage container 10 defining the second space 15. The frozen storage container 10 including the second space 15 separated from a part on an end portion 17 side is cooled by being immersed in liquid nitrogen, and thus the liquid 70 stored in the second space 15 is frozen. After the liquid 70 is frozen, the frozen storage container 10 is stored in a deep freezer or the like.

When the stored frozen liquid 70 is taken out from the frozen storage container 10, the frozen storage container 10 is kept at room temperature or the like, and the frozen liquid 70 in the second space 15 is unfrozen. Further, the frozen storage container 10 is cut at a cutting position 53 indicated by a broken line in FIG. 7(C). The cutting position 53 substantially coincides with the position of the end portion 33 of the partition wall 12 in the axial line 101. Therefore, the first space 14 of the frozen storage container 10 is unsealed. Since the first space 14 and the second space 15 are partitioned by the wall portion 31 of the partition wall 12, the second space 15 is not opened to the outside even if the frozen storage container 10 is cut at the cutting position 53. As a cutting method of the frozen storage container 10, a method using a cutting instrument such as scissors is adopted. A cut along the cutting position 53 may be formed at a peripheral edge of the frozen storage container 10, for example, so that there is no need to use a cutting instrument.

As shown in FIG. 8(A), the user inserts the needle member 41 into the first space 14 of the frozen storage container 10 from the needle tip portion 42. Further, when the needle tip portion 42 further advances toward the second space 15 side from state where the sharp tip end of the needle tip portion 42 is abutted with the wall portion 31 of the partition wall 12, and as shown in FIG. 8(B), the needle tip portion 42 pierces the wall portion 31. Further, as shown in FIG. 8(C), the through hole 45 of the needle tip portion 42 is advanced until the through hole 45 reaches the second space 15. Since the distance in the direction along the axial line 102 between the through hole 45 and the flange portion 49 of the needle member 41 is longer than the distance between the wall portion 31 and the end portion 33 of the partition wall 12, as shown in FIG. 8(C), during advancing of the needle member 41 toward the wall portion 31 of the partition wall 12 of the frozen storage container 10, the needle tip portion 42 of the needle member 41 pierces the wall portion 31 of the partition wall 12 before the flange portion 49 of the needle member 41 abuts the container body 11, and the through hole 45 is located closer to the second space 15 side than the wall portion 31 of the partition wall 12. For example, a step surface formed on an outer peripheral surface of the needle member 41 on a needle tip portion 42 side from the flange portion 49 is abutted with a peripheral edge of the opening (cutting position 53) of the first space 14 of the frozen storage container 10, so that the needle member 41 is prevented from further advancing toward the second space 15, and thus a position of the through hole 45 in the second space 15 is determined. Through such positioning, the through hole 45 of the needle member 41 is located slightly closer to the second space 15 side than the wall portion 31 of the partition wall 12.

Further, as shown in FIG. 8(D), the frozen storage container 10 is positioned above the needle member 41 in the gravity direction, and thus the liquid 70 stored in the second space 15 moves toward the wall portion 31 side. In this state, the liquid 70 stored in the second space 15 can flow out to the outside through the through hole 45, the internal space 48 and the opening of the end portion 46 of the needle member 41. For example, by connecting a suction member such as a syringe to the base end portion 43 of the needle member 41 via a tube, the liquid 70 stored in the second space 15 can be suck out to the syringe or the like. An internal space of the tube, the syringe, or the like is continued with the second space 15 as a closed space, and thus the liquid 70 stored in the second space 15 can be taken out without being in contact with the external air. Since the through hole 45 of the needle member 41 is positioned in the vicinity of the wall portion 31 of the partition wall 12, the liquid 70 remaining in the second space 15 can be reduced.

Effects of Embodiment

According to the frozen storage container 10 of the present embodiment, since the liquid 70 to be frozen and stored, such as a biological sample or a drug is injected into the second space 15 and the second space 15 is liquid-tightly sealed by welding, the liquid nitrogen or the like is prevented from entering the second space 15 during freezing and storage. When the frozen storage container 10 is unsealed, the first space 14 is unsealed and then the wall portion 31 of the partition wall 12 is pierced by the needle member 41, so that when the first space 14 is unsealed, substances adhering to an outer surface of the frozen storage container 10 or the like are prevented from entering the second space 15.

Since the second space 15 is liquid-tightly sealed by high-frequency welding, poor welding is suppressed.

The frozen storage container 10 is translucent, and thus a state of the liquid 70 stored in the second space 15 can be easily visually observed from the outside, for example, during freezing or unfreezing.

Since the frozen storage container 10 is constituted by the container body 11 and the partition wall 12, the container body 11 and the partition wall 12 can be manufactured by adopting different molding methods. Since the tubular portion 30 and the container body 11 overlap each other around the wall portion 31 of the partition wall 12, the strength around the wall portion 31 is stronger than the strength at other portions of the container body 11. Therefore, since the needle member 41 is firmly supported around the wall portion 31 of the partition wall 12, it is easy to take out the biological sample or drug from the second space 15 using a member such as the needle member 41.

The liquid can be easily taken out from the second space 15 of the frozen storage container 10 to the outside by using the needle member 41.

Modification

In the embodiment describe above, an aspect in which the liquid stored in the second space 15 of the frozen storage container 10 is taken out to the outside by using the needle member 41 was described, but the liquid may be taken out from the second space 15 without using the needle member 41. For example, the needle member 41 or the like may be removed after a through hole is formed in the wall portion 31 of the partition wall 12 of the frozen storage container 10 by the needle member 41 or a similar instrument, and the liquid 70 may flow out from the second space 15 through the through hole of the wall portion 31. Since the cutout portion 35 is formed in the partition wall 12, the liquid 70 can flow out from the second space 15 to the outside through the cutout portion 35 without remaining between the inner surface of the container body 11 and the outer surface of the partition wall 12 defining the second space 15.

Figure 9:
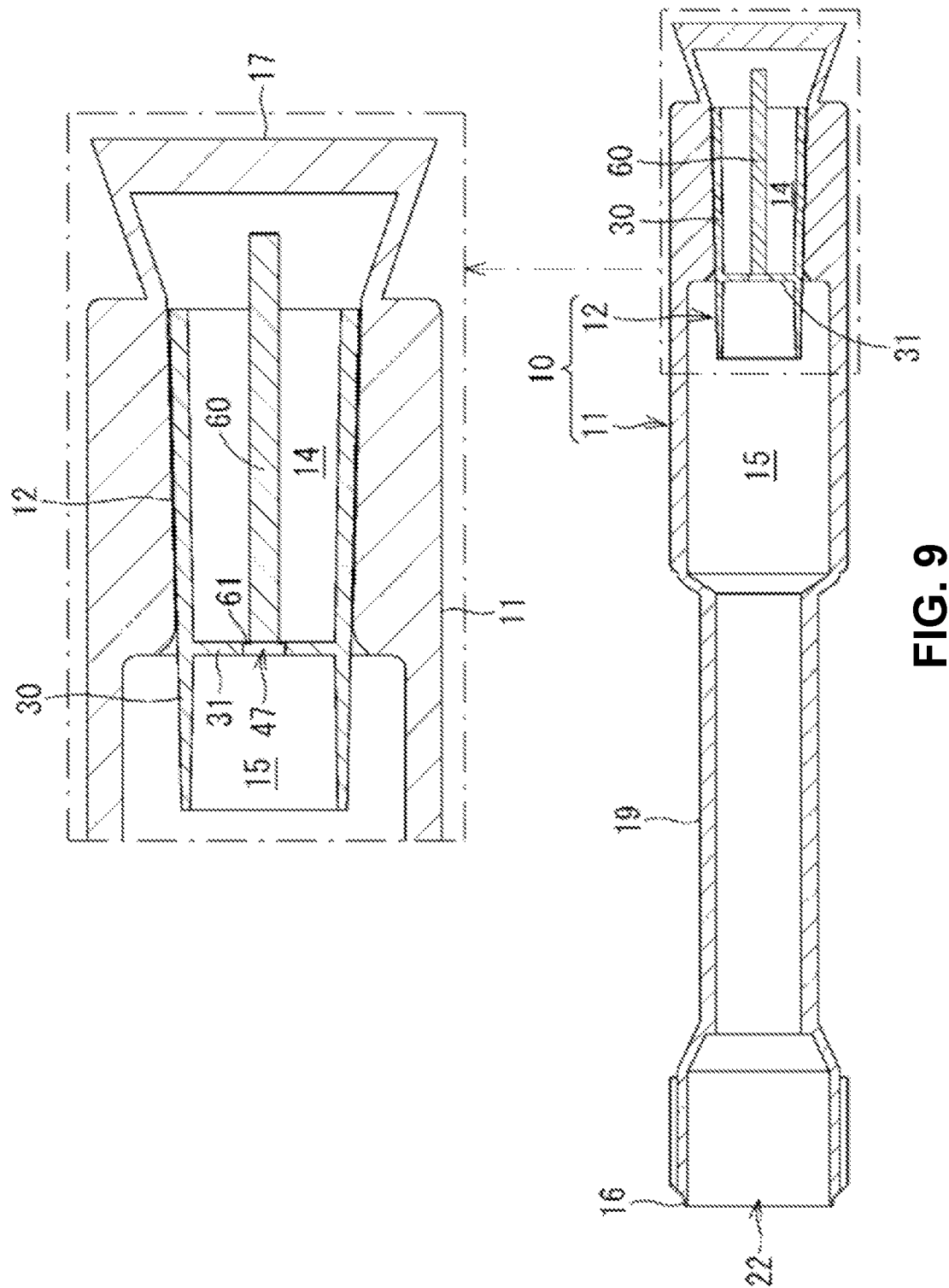
FIG. 9 is a view for explaining a folding bar 60 according to a modification.

As shown in FIG. 9, a folding bar 60 may be provided on the wall portion 31 of the partition wall 12. In the first space 14 of the frozen storage container 10, the folding bar 60 is a member connected to the wall portion 31 so as to close a through hole 47 formed in the wall portion 31 of the partition wall 12. More specifically, one end of the folding bar 60 is connected, by a connecting portion 61, to a part of the wall portion 31 defining the through hole 47. The connecting portion 61 is set to be thin enough to be easily broken by a force applied by the user. After the first space 14 of the frozen storage container 10 is unsealed as described above, the connecting portion 61 is broken when the user applies a force to the folding bar 60, and the through hole 47 establishes communication between the first space 14 and the second space 15. Accordingly, the liquid 70 stored in the second space 15 can flow out to a first space 14 side through the through hole 47. A shape of the folding bar 60 is merely an example, and an arbitrary shape can be adopted as long as the user can apply a force to break the connecting portion 61.

Figure 10B:
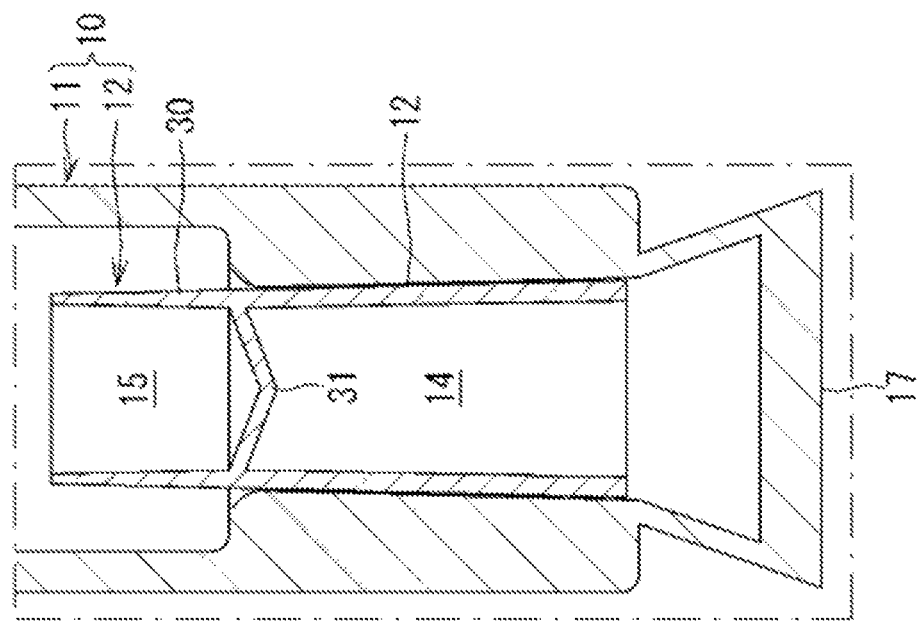
FIGS. 10(A) and 10(B) are cross-sectional views showing modifications of a position and shape of a wall portion 31 of the partition wall 12.
Figure 10A:
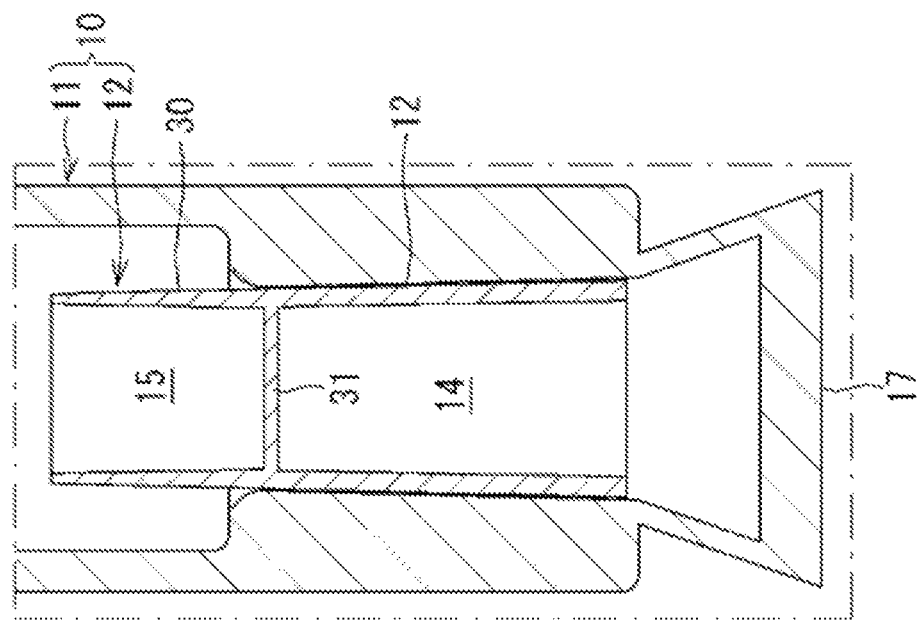

As shown in FIG. 10(A), the wall portion 31 of the partition wall 12 may be disposed in the vicinity of the end portion 17 of the container body 11, at a position closer to the end portion 17 than an end on the second space 15 side where the diameter is reduced by welding to the partition wall 12. According to such a configuration, for example, as shown in FIG. 8(C), the frozen storage container 10 is held in a posture at which the wall portion 31 is the lowermost side in the gravity direction in the second space 15, and the liquid 70 remaining in the second space 15 can be reduced when the liquid 70 flows out from the second space 15 through the through hole 45 of the needle member 41 or the through hole 47. Similarly, as shown in FIG. 10(B), a center (a position through which the axial line 101 passes) of the wall portion 31 of the partition wall 12 has a funnel shape protruding toward the end portion 17 of the container body 11 relative to the other portion, and thus the liquid 70 remaining in the second space 15 can also be reduced.

In the embodiment and modification described above, although the neck portion 19 is formed in the frozen storage container 10 so that the high-frequency welding can be easily and reliably performed, the neck portion 19 may not be provided in the frozen storage container 10 according to an external dimension or the like of the frozen storage container 10.

In the frozen storage container 10, the container body 11 and the partition wall 12 are welded and integrated after being separately molded, but the container body 11 and the partition wall 12 may be integrally formed.

A known method such as thermal welding other than high-frequency welding may be adopted for welding between the container body 11 and the partition wall 12 and welding for sealing the second space 15 in the container body 11. In a case where a known method such as thermal welding is used, low density polyethylene, high density polyethylene, ultrahigh molecular weight polyethylene, nylon, polyester, polystyrene, polyimide, an ethylene-vinyl acetate copolymer, or a laminate thereof are suitable as the material of the container body 11.

REFERENCE SIGNS LIST 10 frozen storage container
11 container body
12 partition wall
13 internal space
14 first space
15 second space
19 neck portion
22 opening
30 tubular portion
31 wall portion
40 frozen storage container system
41 needle member
42 needle tip portion
43 base end portion
47 through hole
48 internal space
60 folding bar
61 connecting portion

The invention claimed is:

1. A frozen storage container, comprising:
a container body with an internal space; and
a partition wall which divides the internal space of the container body at least into a first space and a second space,
wherein in the container body, the first space is liquid-tightly sealed and the second space has an opening which is in communication with the outside,
wherein the second space is liquid-tightly sealable by welding the container body, and
wherein the partition wall includes:
a tubular portion which is capable of being inserted into the internal space of the container body; and
a wall portion which divides an internal space of the tubular portion along a direction intersecting an axial direction of the tubular portion,
the partition wall is inserted into the internal space of the container body, and the tubular portion is welded to the container body.

2. The frozen storage container according to claim 1, wherein the second space is sealable by high-frequency welding the container body.

3. The frozen storage container according to claim 1, wherein a portion defining the second space in the container body includes a neck portion whose external dimension is smaller than that of an end portion defining the opening of the second space.

4. The frozen storage container according to claim 1, wherein the container body is translucent for visible light to transmit therethrough.

5. The frozen storage container according to claim 1, wherein the partition wall includes:
a through hole which penetrates the wall portion; and
a folding bar which is connected with the wall portion to seal the through hole and opens the through hole by breaking a connecting portion with the wall portion.

6. A frozen storage container system, comprising:
the frozen storage container according to claim 1; and
a needle member which includes a needle tip portion capable of being inserted into the internal space of the container body and capable of piercing the partition wall, and has a flow path which is opened at the needle tip portion and is opened at a base end portion opposite to the needle tip portion.

7. The frozen storage container according to claim 1, wherein the partition wall has a through hole; and
further comprising a folding bar comprising a connecting portion connecting to the partition wall so that the folding bar seals the through hole; and
wherein the connecting portion is a thin member configured to be irreversibly broken under an applied force at the folding bar so as to expose the through hole and allow a content of the internal space to flow out through the through hole when the folding bar is moved so as to break the connecting portion.

8. A storage container adapted to store a drug or biological sample while the storage container is exposed to a freezing environment, the storage container comprising:
a first elongated member having an internal space extending from a first end to an opposite, second end, the first elongated member including a neck portion, a body portion, and a second end portion, the neck portion extending from the first end to the body portion, the body portion extending from the neck portion to said second end portion, the second end portion extending from said body portion to said second end, the internal space having a first diameter along the neck portion and having a second diameter greater than the first diameter along the body portion, wherein said drug or biological sample is received for storage through the first end, stored in the body portion, and extracted for use through said second end portion;
a first weld at the first end of the first elongated member serving as a first closure of the internal space;
a second weld at the first elongated member in the neck portion spaced apart from the first weld and serving as a second closure of the internal space, thereby isolating a first portion of the internal space, which is located between said first weld and said second weld, from a second portion of the internal space, the first weld and the second weld being applied after the drug or biological sample is stored in the body portion;
a tubular partition member having a tubular portion and a wall portion, the wall portion defining a partition wall located within the tubular portion intermediate to respective ends of the tubular portion; and a third weld at the second end portion sealing the tubular partition member within the first elongated member;

wherein the tubular partition member is fixedly positioned within said internal space, so that a first length portion of the tubular portion extends within the body portion, a second length portion of the tubular portion extends within said second end portion, and the partition wall seals the second portion of the internal space toward the second end of the first elongated member.

9. The storage container according to claim 8, wherein the partition wall is puncturable by a needle permitting access to the drug or biological sample within said second portion of the internal space by the needle through the second end portion when the second end portion is opened.

10. The storage container according to claim 9 in combination with a needle member; and wherein the needle member includes a needle tip portion and a base end portion and having a flow path which extends from a first opening at the needle tip portion to a second opening at the base end portion opposite to the needle tip portion; and wherein the needle member is capable of piercing the partition wall when inserted into the tubular partition member at the second end portion of the elongated member when the second end portion has been opened.

11. The storage container according to claim 8, wherein the partition wall has a through hole; and wherein the tubular partition member further includes a folding bar which extends within the second end portion to the partition wall to block the through hole, the folding bar comprising a connecting portion connecting to the partition wall so that the folding bar seals the through hole isolating the internal space of the body portion from the internal space of the second end portion; and wherein the connecting portion is a thin member configured to be irreversibly broken under an applied force at the folding bar so as to expose the through hole to the internal space of the second end portion and allow a content of the internal space of the body portion to flow through the through hole into the internal space of the second end portion when the folding bar is moved so as to break the connecting portion.

* * * * *